United States Patent
Son et al.

(10) Patent No.: US 12,524,469 B2
(45) Date of Patent: Jan. 13, 2026

(54) METHOD FOR GENERATING COMMON IDENTIFIER AND APPARATUS THEREFOR

(71) Applicant: SAMSUNG SDS CO., LTD., Seoul (KR)

(72) Inventors: Yong Ha Son, Seoul (KR); Kyoo Hyung Han, Seoul (KR); Seong Kwang Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 112 days.

(21) Appl. No.: 18/396,442

(22) Filed: Dec. 26, 2023

(65) Prior Publication Data

US 2024/0346083 A1 Oct. 17, 2024

(30) Foreign Application Priority Data

Apr. 17, 2023 (KR) .................. 10-2023-0049900
Sep. 14, 2023 (KR) .................. 10-2023-0122560

(51) Int. Cl.
*G06F 16/903* (2019.01)

(52) U.S. Cl.
CPC .............. *G06F 16/90335* (2019.01)

(58) Field of Classification Search
CPC .................................. G06F 16/90335
See application file for complete search history.

(56) References Cited

FOREIGN PATENT DOCUMENTS

KR 10-1575282 B1 12/2015
WO WO-2023004360 A1 * 1/2023 ......... G06F 21/6245

OTHER PUBLICATIONS

Extended European Search Report dated Jul. 3, 2024, issued by the European Patent Office in European Application No. 23218971.2.

\* cited by examiner

*Primary Examiner* — Frantz B Jean
(74) *Attorney, Agent, or Firm* — Sughrue Mion, PLLC

(57) ABSTRACT

Provided are a method for generating a common identifier and an apparatus therefor. The method according to some embodiments may include acquiring a matching function, which is used for record matching between a first record set and a second record set, the first record set and the second record set being a record set of the first party and a record set of a second party, respectively, and the second record set having an identifier column with identifiers assigned, performing a containment operation on the second record set and column values of records in the first record set, and determining an identifier for at least some of the record in the first record set based on the identifiers of the second record set and an output value of the matching function for a result of the containment operation.

16 Claims, 18 Drawing Sheets

FIG. 18

[FIRST PARTY]

| $T_{X\ Name}$ | $T''_{X\ Birthdate}$ | $T''_{X\ Email}$ | $T''_{X\ Addr}$ |
|---|---|---|---|
| $b_1, v_1$ | $b_1, v_1$ | $b_1, v_1$ | $b_1, v_1$ |
| $b_2, v_2$ | $b_2, v_2$ | $b_2, v_2$ | $b_2, v_2$ |
| $b_5, v_5$ | $b_5, v_5$ | $b_5, v_5$ | $b_5, v_5$ |
| ... | ... | ... | ... |

Columns: 114, 181, 182, 184

[SECOND PARTY]

| $T_{Y\ Name}$ | $T'_{Y\ Birthdate}$ | $T'_{Y\ Email}$ | $T'_{Y\ Addr}$ |
|---|---|---|---|
| $b_1, v_1$ | $b_1, v_1$ | $b_1, v_1$ | $b_1, v_1$ |
| $b_2, v_2$ | $b_2, v_2$ | $b_2, v_2$ | $b_2, v_2$ |
| $b_5, v_5$ | $b_5, v_5$ | $b_5, v_5$ | $b_5, v_5$ |
| ... | ... | ... | ... |

Columns: 114, 153, 183, 185

METHOD FOR GENERATING COMMON IDENTIFIER AND APPARATUS THEREFOR

CROSS-REFERENCE TO RELATED APPLICATION(S)

This application claims priority from Korean Patent Application No. 10-2023-0049900 filed on Apr. 17, 2023 and Korean Patent Application No. 10-2023-0122560 filed on Sep. 14, 2023 in the Korean Intellectual Property Office, and all the benefits accruing therefrom under 35 U.S.C. 119, the contents of which in its entirety are herein incorporated by reference(s).

BACKGROUND

1. Field

The present disclosure relates to a method for generating and assigning a common identifier for data of different parties and an apparatus therefor.

2. Description of the Related Art

As legal regulations regarding data processing are increasingly strengthened, technologies (commonly known as privacy enhancing technologies (PETs)) for performing necessary analyses while securely protecting the data of different institutions are gaining significant attention. These technologies generally start from situations where common identifiers exist for the data of each institution, and combine and analyze the data based on the common identifiers.

However, in actual scenarios, there are often cases where there are no common identifiers (e.g., social security numbers in the case of personal data) between the data of different institutions. In other words, in most cases, it is difficult to directly apply PETs, and the problem of securely assigning common identifiers to the data of different institutions needs to be addressed first.

SUMMARY

Aspects of the present disclosure provide a method and system for quickly (e.g., with low computational complexity) generating and assigning a common identifier for data of different parties.

Aspects of the present disclosure also provide a method and system for securely (e.g., without leaking intermediate information) generating and assigning a common identifier for data of different parties without the help of a trusted third party.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a method for generating a common identifier performed by a computing device of a first party. The method may comprise: acquiring a matching function, which is used for record matching between a first record set and a second record set, the first record set and the second record set being a record set of the first party and a record set of a second party, respectively, and the second record set having an identifier column with identifiers assigned, performing a containment operation on the second record set and column values of records in the first record set; and determining an identifier for at least some of the record in the first record set based on the identifiers of the second record set and an output value of the matching function for a result of the containment operation.

In some embodiments, the matching function may be defined based on Boolean operator.

In some embodiments, the performing the containment operation may include: when a particular column value of a first record in the first record set is contained in a second record in the second record set, storing an identifier of the second record in the result of the containment operation.

In some embodiments, the determining the identifier may include: when as a result of applying a containment operation result for a first record in the first record set to the matching function, a value indicating that the second record set contains a second record that matches the first record is output, determining an identifier of the second record as an identifier of the first record.

In some embodiments, 5, the determining the identifier may include: when as a result of applying a containment operation result for a first record in the first record set to the matching function, a value indicating that the second record set does not contain a second record that matches the first record is output, determining an identifier of the first record randomly.

In some embodiments, the performing the containment operation may include: performing a first operation with the second party based on a circuit-based private set intersection (CPSI) protocol using data from a first column of the first record set, data from a second column of the second record set, and data from the identifier column of the second record set, the second column being a column that corresponds to the first column; and acquiring a first secret share for the first column as a result of the first operation, the result of the first operation including the first secret share and a second secret share, wherein the second secret share is distributed to the second party, and the first secret share and second secret share are secret shares regarding containment information of the first column and the data from the identifier column of the second record set.

In some embodiments, the performing the containment operation may further include: acquiring a third secret share for a third column of the first record set by performing a second operation with the second party based on the CPSI protocol using data from a third column of the first record set, data from a fourth column of the second record set, and data from the identifier column of the second record set, the fourth column being a column that corresponds to the third column, a result of the second operation including the third secret share and a fourth secret share, the fourth secret share being distributed to the second party, and the first secret share having a different element order from the third secret share and fourth secret share; and performing a third operation based on an oblivious shuffle (OS) protocol with the second party based on the fourth secret share and a permutation function for rearranging an element order of the third secret share to be aligned with the first secret share.

In some embodiments, the performing the containment operation may further include: acquiring a fifth secret share as a result of the third operation, the result of the third operation including the fifth secret share and a sixth secret share and the sixth secret share being distributed to the second party; rearranging an element order of the third secret share using the permutation function; updating the fifth secret share by reflecting the rearranged third secret share in the fifth secret share; and replacing the third secret share with the updated fifth secret share, wherein the fourth secret share held by the second party is replaced with the sixth secret share.

In some embodiments, a first plurality of secret shares including the first secret share may be acquired as the result of the first operation, a second plurality of secret shares including the second secret share are distributed to the second party, and wherein the determining the identifier may include: acquiring an output value of the matching function for a particular record in the first record set by performing an operation with the second party based on a multi-party computation protocol using the first plurality of secret shares and the second plurality of secret shares; and determining an identifier of the particular record based on the acquired output value.

According to another aspect of the present disclosure, there is provided a method for generating a common identifier performed by a computing device of a second party. The method may include: acquiring a matching function, which is used for record matching between a first record set and a second record set, the first record set and the second record set being a record set of a first party and a record set of the second party, respectively; assigning identifiers to an identifier column of the second record set; and performing a containment operation on the second record set and column values of records in the first record set, wherein an identifier for at least some of the record in the first record set is determined based on the identifiers of the second record set and an output value of the matching function for a result of the containment operation.

In some embodiments, the identifiers assigned to the identifier column may be determined randomly.

In some embodiments, wherein the performing the containment operation may include: performing a first operation with the first party based on a circuit-based private set intersection (CPSI) protocol using data from a first column of the first record set, data from a second column of the second record set, and data from the identifier column of the second record set, the second column being a column that corresponds to the first column; and acquiring a second secret share as a result of the first operation, the results of the first operation including a first secret share and the second secret share, wherein the first secret share is distributed to the first party, and the first secret share and second secret share are secret shares regarding containment information of the first column and the data from the identifier column.

In some embodiments, the performing the containment operation may further include: performing a second operation with the first party based on the CPSI protocol using data from a third column of the first record set, data from a fourth column of the second record set, and data from the identifier column of the second record set, the fourth column being a column of that corresponds to the third column; acquiring a fourth secret share as a result of the second operation, the result of the second operation including a third secret share and the fourth secret share, the third secret share being distributed to the first party, and the second secret share having a different element order from the third and fourth secret shares; and performing a third operation based on an oblivious shuffle (OS) protocol with the first party based on the fourth secret share and a permutation function for rearranging an element order of the third secret share to be aligned with the first secret share.

In some embodiments, the performing the containment operation may further include: acquiring a sixth secret share as a result of the third operation, the result of the third operation including a fifth secret share and the sixth secret share and the fifth secret share being distributed to the first party; and replacing the fourth secret share with the sixth secret share.

According to yet another aspect of the present disclosure, there is provided an apparatus for generating a common identifier. The apparatus may include: at least one processor; a communication interface configured to communicate with a second party; and a memory configured to store a computer program to be executed by the at least one processor, wherein the computer program comprises instructions for: acquiring a matching function, which is used for record matching between a first record set and a second record set, the first record set and the second record set being a record set of the first party and a record set of a second party, respectively, and the second record set having an identifier column with identifiers assigned; performing a containment operation on the second record set and column values of records in the first record set; and determining an identifier for at least some of the record in the first record set based on the identifiers of the second record set and an output value of the matching function for a result of the containment operation.

According to yet another aspect of the present disclosure, there is provided an apparatus for generating a common identifier. The apparatus may include: at least one processor; a communication interface configured to communicate with a first party; and a memory configured to store a computer program to be executed by the at least one processor, wherein the computer program comprises instructions: acquiring a matching function, which is used for record matching between a first record set and a second record set, the first record set and the second record set being a record set of a first party and a record set of the second party, respectively assigning identifiers to an identifier column of the second record set; and performing a containment operation on the second record set and column values records in the first record set, and wherein an identifier for at least some of the record in the first record set is determined based on the identifiers of the second record set and an output value of the matching function for a result of the containment operation.

BRIEF DESCRIPTION OF THE DRAWINGS

The above and other aspects and features of the present disclosure will become more apparent by describing in detail example embodiments thereof with reference to the attached drawings, in which:

FIG. 18 is a schematic view illustrating the results of the rearrangement operation based on the OS protocol according to some embodiments of the present disclosure;

DETAILED DESCRIPTION

Figure 1:
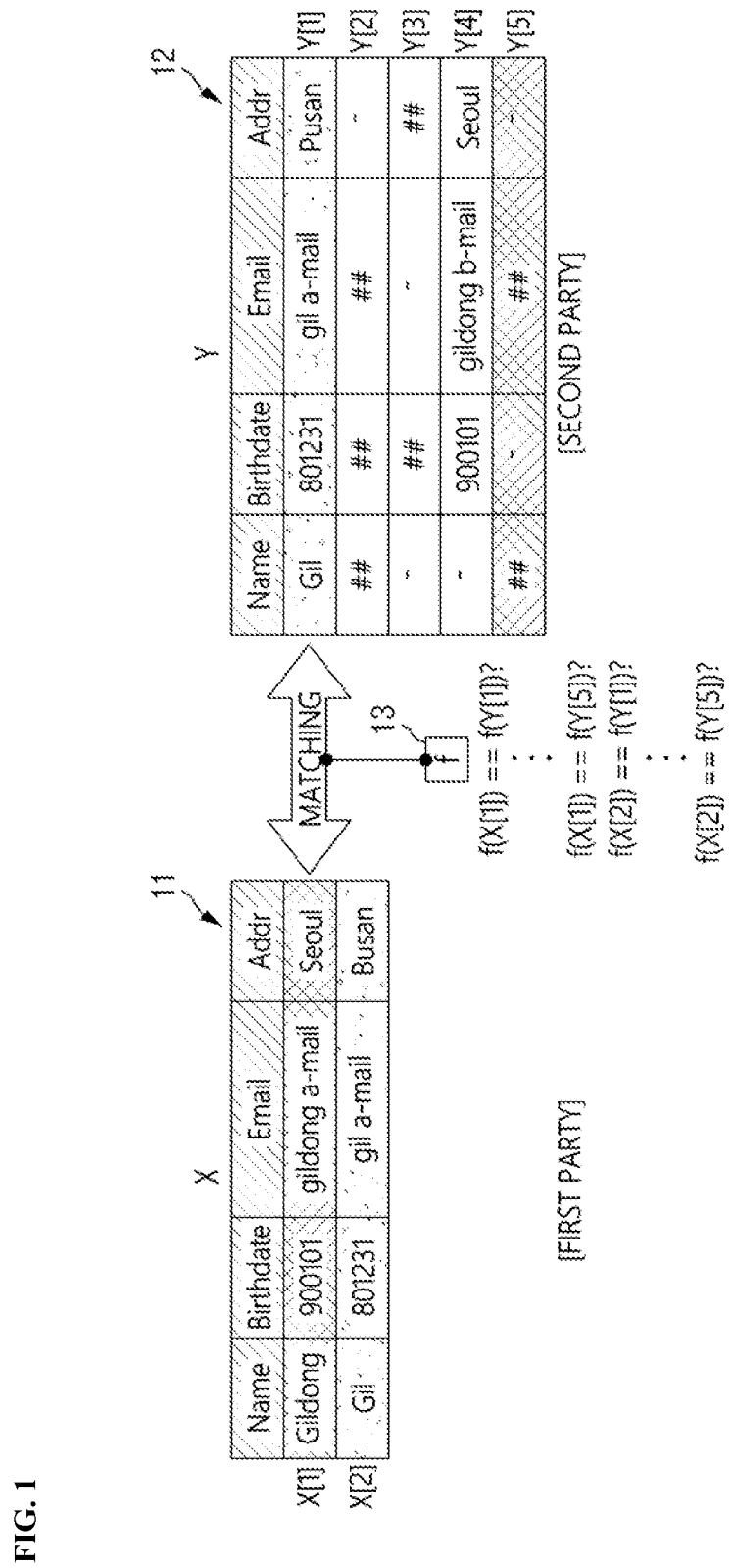
FIG. 1 is a schematic view illustrating the problems associated with an existing common identifier generation technique.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

For the convenience of understanding embodiments of the present disclosure, an existing (prior) common identifier generation technique and its problems will hereinafter be described briefly with reference to FIG. 1. In FIG. 1 and the subsequent drawings, "X" refers to data ("11") of a first party and "Y" refers to data ("12") of a second party. Since the data (11 and 12) may consist of multiple records (e.g., X[1], X[2], Y[1], and Y[2]), the data (11 and 12) will hereinafter be referred to as record sets, which may also be referred to as data sets or tables.

Referring to FIG. 1, it is assumed that a common identifier is generated for the record set 11 (hereinafter, the first record set 11) of the first party and the record set 12 (hereinafter, the second record set 12) of the second party, and that there are no unique identifiers (such as social security numbers) in both the first and second record sets 11 and 12.

In this case, the existing common identifier generation technique identifies any matching pair by performing a matching operation on all pairs (e.g., (X[i], Y[j])) of the first and second record sets 11 and 12 via a matching function 13, which is a function that determines whether two records are of the same person). Then, the existing common identifier generation technique assigns a common identifier (or the same identifier) to each matching pair (i.e., two matching records).

However, the existing common identifier generation technique has issues in terms of computational complexity (speed) and security. Specifically, when the size (i.e., the number of records) of the first and second record sets 11 and 12 is "N," the existing common identifier generation technique requires a matching operation with a complexity of $O(N^2)$, resulting in considerably slow computation speed. Additionally, the existing common identifier generation technique has a problem in that it may not securely generate a common identifier without the help of a trusted third party. As a result, matching results, intermediate information, etc., may inevitably be leaked to at least one party.

A brief explanation of the existing common identifier generation technique has been presented with reference to FIG. 1. Various embodiments of the present disclosure designed to address the aforementioned problems will hereinafter be described with reference to FIG. 2 and the subsequent drawings.

Figure 2:
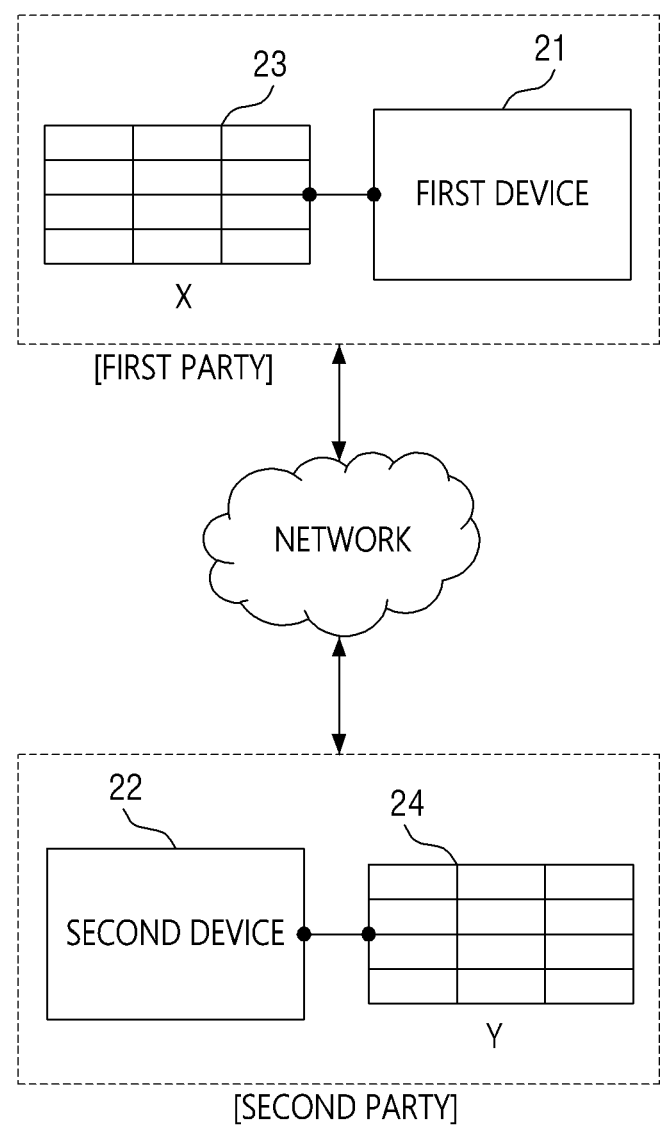
FIG. 2 is a block diagram illustrating the environment in which a common identifier generation method according to some embodiments of the present disclosure is performed.

FIG. 2 is an example schematic view illustrating the environment in which a common identifier generation method according to some embodiments of the present disclosure is performed. In FIG. 2 and the subsequent drawings, a device (or an apparatus) 21 of the first party and a device 22 of the second party are illustrated as a first device and a second device, respectively, which are used herein to refer to the devices 21 and 22 of the first and second parties. However, the terms "party" and "device" may also be used interchangeably. For example, the first party may refer to the first device 21, and vice versa.

Referring to FIG. 2, the method of generating a common identifier according to some embodiments of the present disclosure may be performed in an environment where the first and second devices 21 and 22 communicate (i.e., interact) with each other. For example, the first and second devices 21 and 22 may securely generate and assign a common identifier for first and second record sets 23 and 24 through their communication, without the assistance of a trusted institution.

The first and second devices 21 and 22 may also be referred to as modules, units, or systems or as common identifier generation devices, identifier sharing devices, computing devices, and security devices in consideration of their functionalities. A common identifier may also be referred to as a shared identifier.

A method in which the first and second devices 21 and 22 generate a common identifier for the first and second record sets 23 and 24 will be described later with reference to FIG. 3 and the subsequent drawings.

Each of the first and second devices 21 and 22 may be implemented as at least one computing device. For example, all functionalities of the first device 21 may be implemented in a single computing device. Alternatively, for example, first and second functionalities of the first device 21 may be implemented in first and second computing devices, respectively. Yet alternatively, for example, a particular functionality of the first device 21 may be implemented across multiple computing devices.

Figure 20:
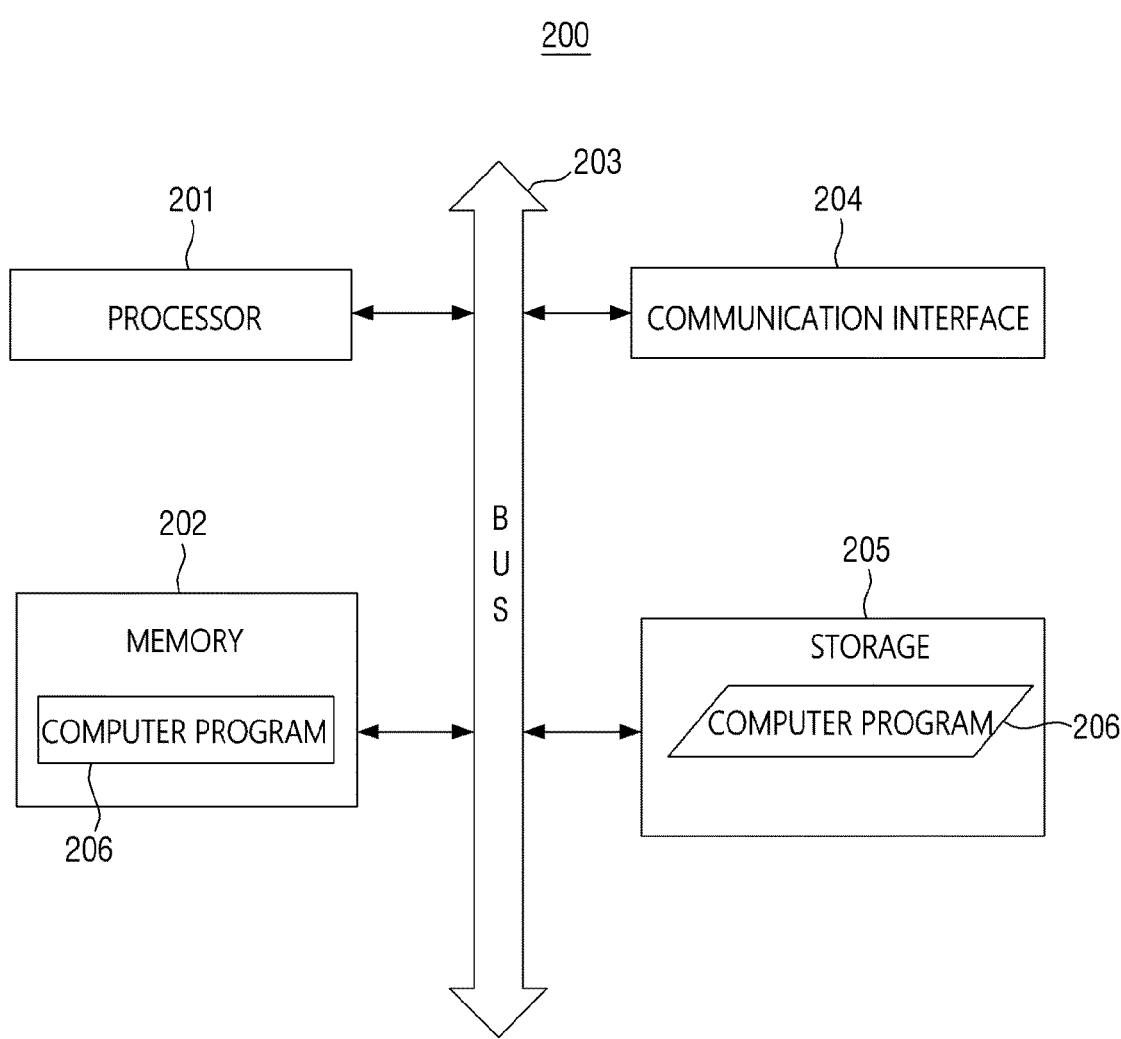
FIG. 20 is a hardware configuration view illustrating an example computing device that may implement a common identifier generation device according to some embodiments of the present disclosure.

Here, the term "computing device" encompasses any device equipped with computing capabilities. An example computing device is as illustrated in FIG. 20. A computing device, which is an assembly where various components (e.g., memories, processors, and the like) interact, may also be referred to as a computing system. Also, the term "computing system" may also encompass the concept of a group of multiple computing devices interacting with each other.

As depicted, the first and second devices 21 and 22 may communicate via a network. Here, the network may be implemented as any type of wired/wireless network, such as a local area network (LAN), wide area network (WAN), mobile radio communication network, Wireless Broadband Internet (Wibro), etc.

Until now, a brief explanation of the environment in which the common identifier generation method according to some embodiments of the present disclosure is performed has been presented with reference to FIG. 2. The common identifier generation method according to some embodiments of the present disclosure will hereinafter be described with reference to FIG. 3 and the subsequent drawings.

For the convenience of understanding, it is assumed that all steps/operations of methods that will be described are performed in the environment exemplified in FIG. 2. Therefore, if the entity responsible for each particular step/operation is not mentioned, it may be understood that the corresponding step/operation is performed by the first device 21 and/or the second device 22. However, in an actual environment, some steps/operations of the methods that will be described may be performed on other computing devices.

Also, for the further convenience of understanding, it is assumed that the first party and/or the second party is responsible for each particular step/operation of the methods that will be described. Therefore, when the first party performs a particular operation, it may be understood that the first device 21 performs the corresponding particular operation, and similarly, when the second party performs a particular operation, it may be understood that the second device 22 performs the corresponding particular operation.

First, the overall flow and operating principles of the common identifier generation method according to some embodiments of the present disclosure will hereinafter be described with reference to FIGS. 3 through 7.

Figure 3:
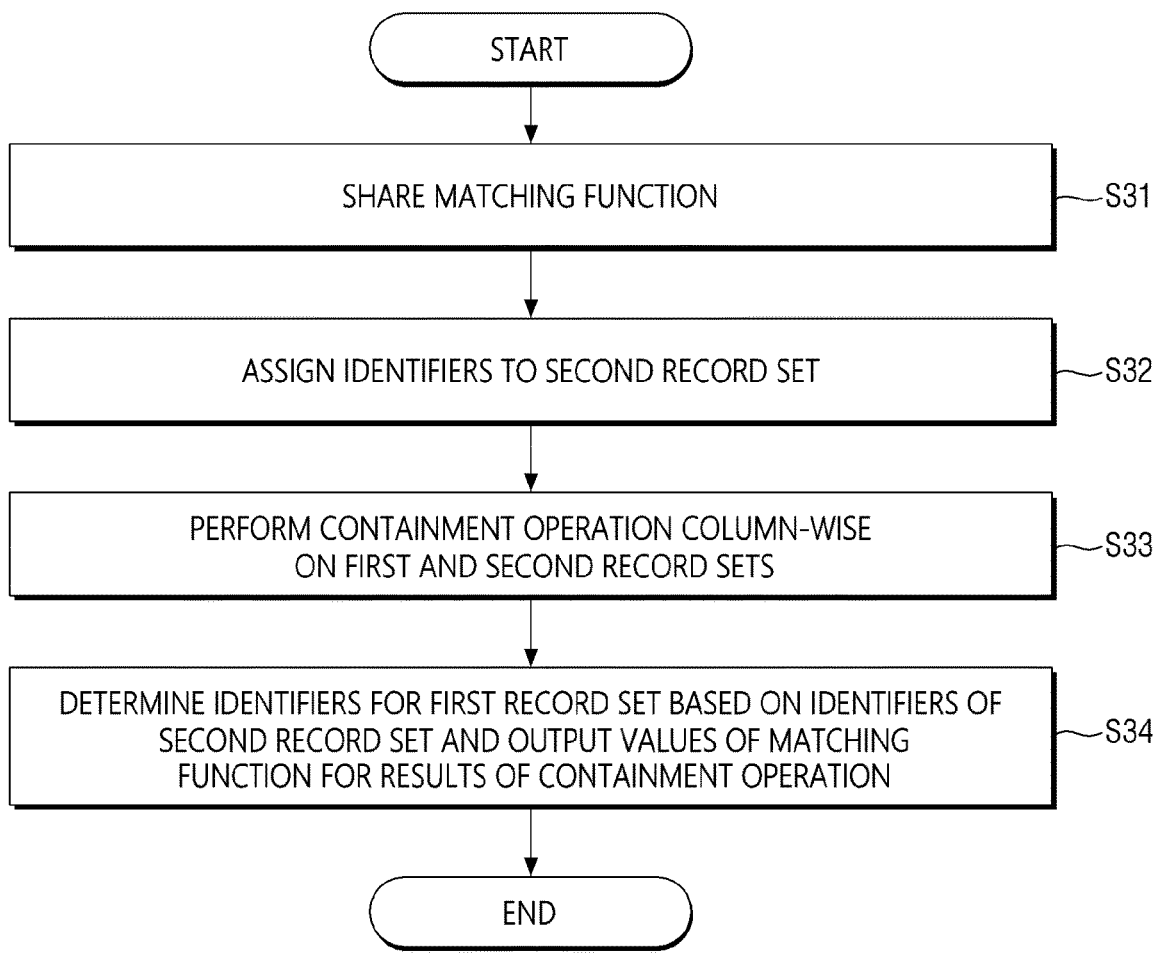
FIG. 3 is a flowchart illustrating the overall flow of the common identifier generation method according to some embodiments of the present disclosure.

FIG. 3 is a flowchart illustrating the overall flow of the common identifier generation method according to some embodiments of the present disclosure. However, the embodiment of FIG. 3 is merely example, and some steps may be added or deleted as needed.

Referring to FIG. 3, the common identifier generation method according to some embodiments of the present disclosure may begin with step S31, which involves sharing a matching function between the first and second parties (i.e., between the first and second devices 21 and 22). The method in which the matching function is shared is not particularly limited.

The matching function refers to a function used for record matching between the first record set held by the first party and the second record set held by the second party. For example, the matching function may be defined based on a matching operation involving Boolean operators (e.g., "AND", "OR", etc.) for columns (e.g., the "Name," "Birth," "Email," and "Addr" columns of FIG. 1) corresponding to quasi-identifiers, which are not unique but have an identification functionality, but the present disclosure is not limited thereto. An example of the matching function is as indicated by Equation (1) below.

In step S32, identifiers may be assigned to the second record set. For example, the second party may randomly generate identifiers for records in the second record set by, for example, randomly sampling strings, and may assign the generated identifiers to an identifier column for the corresponding records in the second record set, but the present disclosure is not limited thereto. The method in which the identifiers are generated is not particularly limited. The embodiment of FIG. 3 assumes that the second party generates the identifiers.

In step S33, a containment operation may be performed for the columns of each of the first and second record sets. The containment operation refers to an operation (e.g., an intersection operation) performed to determine containment information (e.g., a containment status). Specifically, the containment operation may be performed to determine whether the column values of each record in the first record set are contained or exist in the second record set. The containment operation may be performed in units of the columns of each record in the first record set, but the present disclosure is not limited thereto.

For reference, the containment operation may be understood as being implementable with a complexity of O(N) when the larger of the first and second record sets has a size of N. A circuit-based private set intersection (CPSI) protocol or algorithm (e.g., PSTY19, etc.) that may derive containment information and have the complexity of O(N) is already well known in the art to which the present disclosure pertains, and thus, a detailed description thereof will be omitted.

On the other hand, when performing the containment operation, the identifiers of the second record set may be included in the results of the containment operation. Specifically, if the value of a given column of a particular record in the first record set is identified as being contained in a particular record in the second record set, the identifier of the particular record in the second record set may be stored, being matched to the given column of the particular record in the first record set. For example, if the value of a first column of a first record in the first record set is contained in a second record in the second record set, the identifier of the second record may be stored, being matched to the first column of the first record in the first record set. Also, for example, if the value of a second column of the first record in the first record set is contained in the second record in the second record set, the identifier of the second record may be stored, being matched to the second column of the first record in the first record set. These stored identifiers may be used to determine the identifier of the first record. In other words, these stored identifiers become candidates for a common identifier.

In step S34, identifiers for at least some of the records in the first record set may be determined based on the output values of the matching function for the results of the containment operation (e.g., matching status values) and the identifiers of the second record set (e.g., identifiers of the second record set that have been stored, being matched to columns of each record in the first record set).

Specifically, for example, if as a result of applying a containment operation result for the first record in the first record set, i.e., column-wise containment information of the first record, to the matching function, a "true" value is output indicating that there is a matching second record in the second record set for the first record in the first record set, the identifier of the second record in the second record set may be determined as the identifier of the first record (and may become a common identifier). For example, if there exists a matching record for the first record in the first record set in the second record set, an identifier stored as a match for the corresponding column of the first record in the first record set may be determined as the identifier of the first record. If there are multiple identifiers stored for the corresponding column of the first record in the first record set, any one of the multiple identifiers may be determined as the identifier of the first record.

Conversely, if as a result of applying the containment operation result for the first record in the first record set, i.e., the column-wise containment information of the first record, to the matching function, a "false" value is output indicating that there is no matching second record for the first record in the second record set, the identifier of the first record may be determined randomly (or in another method).

For the convenience of understanding, the generation of a common identifier will hereinafter be described in further detail with reference to FIGS. 4 through 7.

Referring to FIGS. 4 through 7, it is assumed that the first and second parties possess first and second record sets 41 and 42, respectively, and that a matching function 43 ("f") is shared in advance between the first and second parties. The matching function 43 may be defined by the following equation.

$$f=[(\text{Name Match}) \text{ AND } (\text{Birth Date Match})] \text{ OR } [(\text{Email Match}) \text{ AND } (\text{Address Match})]. \quad \text{[Equation 1]}$$

Figure 4:
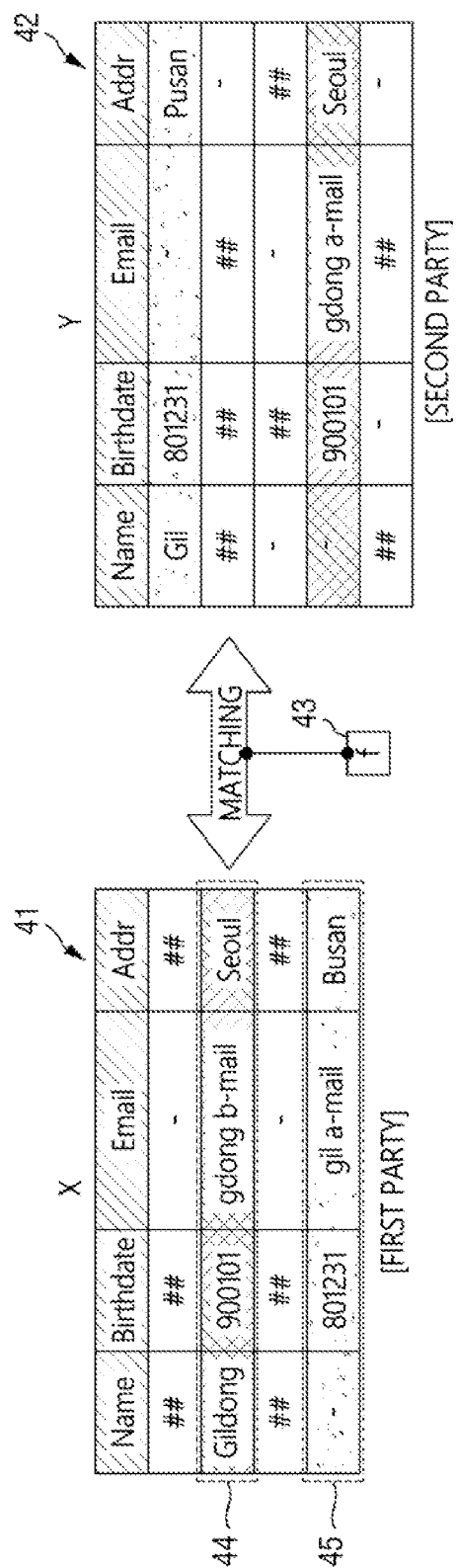
FIG. 4 is a schematic view illustrating record sets of first and second parties that may be referenced in some embodiments of the present disclosure.

For reference, FIG. 4 shows records with matching column values, for example, a second record 44 of the first record set 41 and a fourth record in the second record set 42, which, however, may not necessarily be a matching pair. Actually, no matching pairs exist in the example of FIG. 4.

Figure 5:
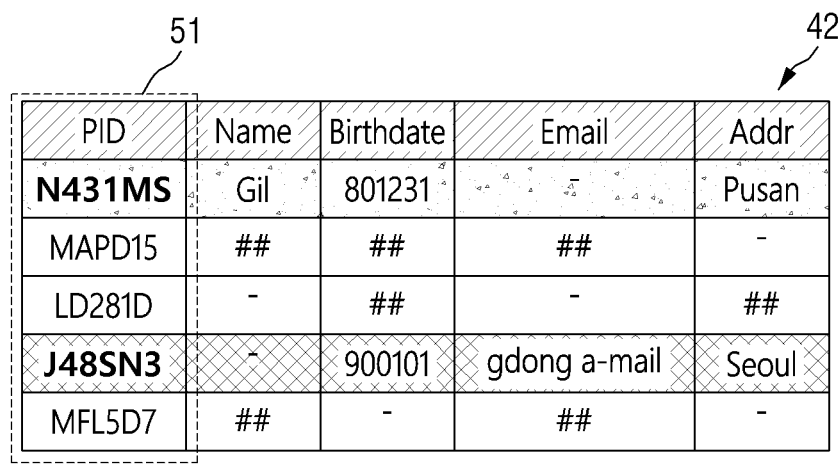
FIG. 5 is a schematic view illustrating the record set of the second party of FIG. 4 with identifiers assigned.

FIG. 5 shows the results of random identifier allocation in the second record set 42, specifically, in a "PID" column 51.

Figure 6:
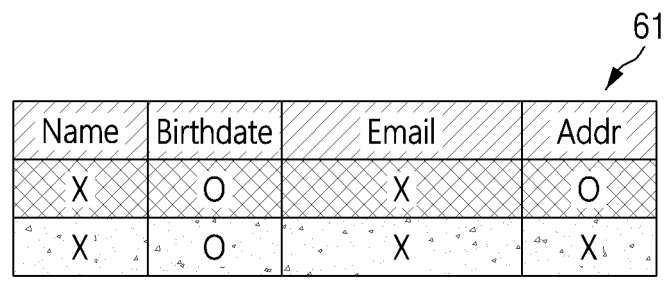
FIGS. 6 and 7 are schematic views illustrating containment operation results for the record sets of FIG. 4.

FIG. 6 shows the results of the containment operation performed on the first and second record sets 41 and the second record set 42. For convenience, FIG. 6 shows containment operation results only for two records in the first record set 41, i.e., the second record 44 and a fourth record 45. As the containment operation is performed on the columns in the first record set 41, containment information 61 of FIG. 6 may be obtained.

Figures 7, 8:
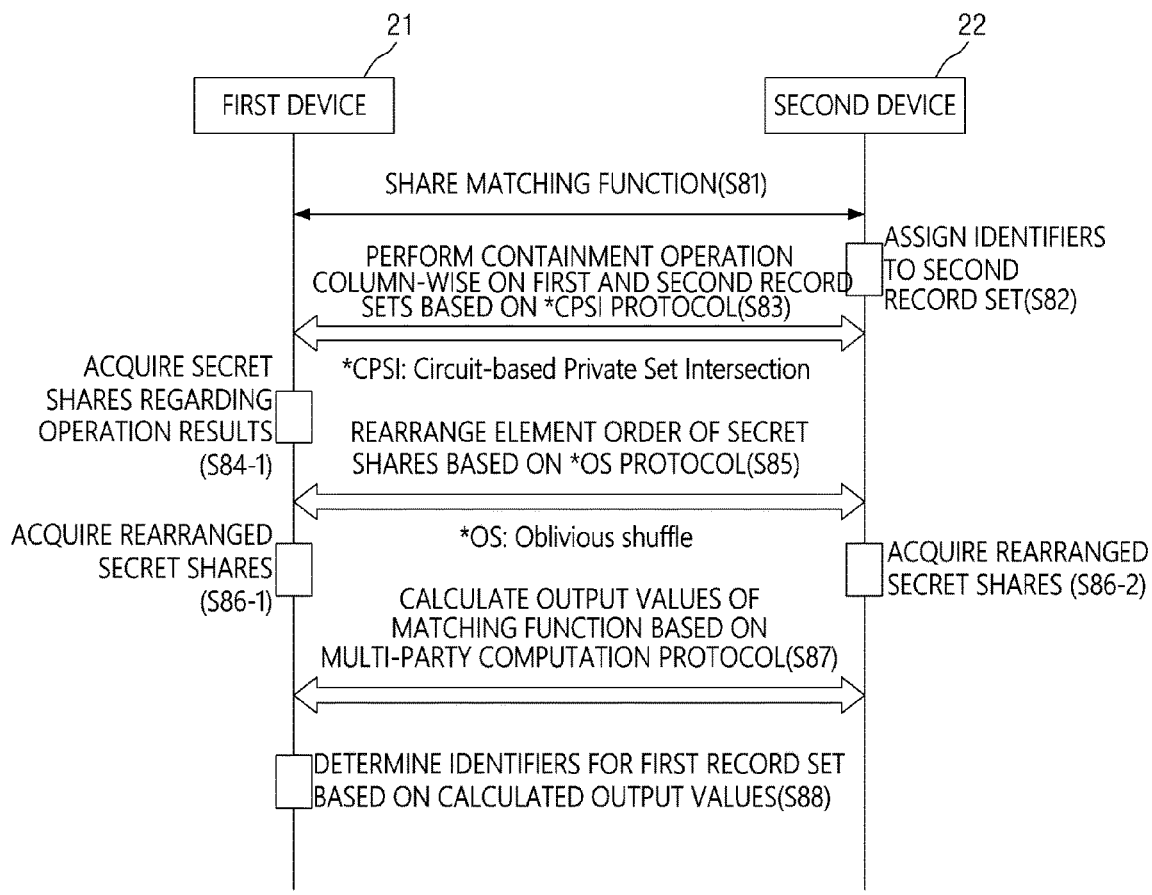
FIG. 8 is a flowchart illustrating a common identifier generation method according to some embodiments of the present disclosure that considers cryptographic implementations.
Figure 9:
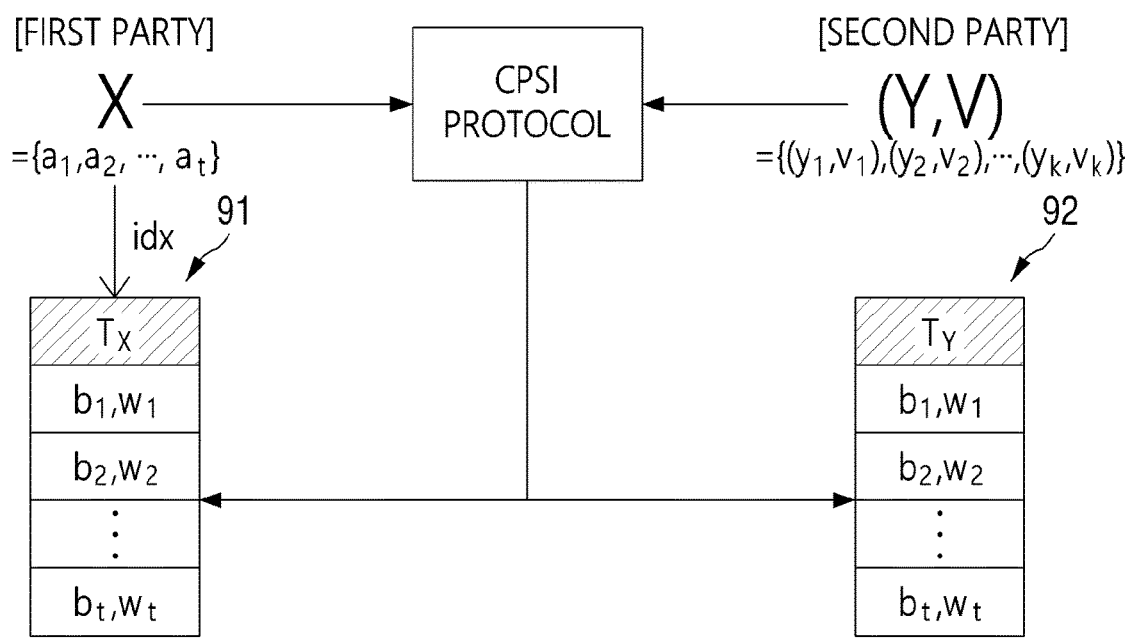
FIGS. 9 and 10 are schematic views illustrating a circuit-based private set intersection (CPSI) protocol that may be referenced in some embodiments of the present disclosure.

FIG. 7 shows how to store the identifiers of the second record set 42 to be matched to the columns of each record in the first record set 41. Referring to FIG. 7, since the "Birthdate" and "Addr" column values of the second record 44 match their respective column values of the fourth record in the second record set 42, an identifier 71 for the fourth record in the second record set 42 may be stored by being matched to the "Birthdate" and "Addr" columns in the second record 44.

Once the containment information 61 of FIG. 7 is given, the identifiers of the first record set 41 may be determined using the matching function 43. For example, since the application of a containment operation result (i.e., column-wise containment information) for the second record 44 to the matching function 43 produces a "false" value, the identifier of the second record 44 may be determined randomly.

So far, the generation of a common identifier has been described with reference to FIGS. 4 through 7.

Table 1 below summarizes the aforementioned content in the form of an algorithm. Specifically, Table 1 assumes that the matching function is based on Boolean operators (that is, defined to output "true" and "false" values) and that the identifiers of the second record set are determined randomly. In Table 1, the term "table" refers to a record set.

TABLE 1

| Step | Description |
|---|---|
| 1 | The second party assigns a random identifier (ID) to a j-th record Y[j] of its table Y.<br>ID_Y[j] = Random ID |
| 2 | For the first party's table X and the second party's table Y, a containment operation is performed column-wise, and if a containment relationship exists, the ID of the corresponding record in table Y is stored.<br>if a k-th column value of an i-th record X[i] of table X matches with a k-th column value of the j-th record Y[j] of table Y (e.g., X[i][k] == Y[j][k]),<br>a) b[i][k] = 1 (if not matched, b[i][k] = 0)<br>b) Candidate_ID_X[i][k] = ID_Y[j] |
| 3 | The results of the containment operation for the i-th record X[i] of table X is input to the matching function. If the output of the matching function is "true," one of previously-stored IDs is assigned to the i-th record X[i]. If not, a random ID is assigned to the i-th record X[i].<br>if f(b[i][1], . . . , b[i][n]) = 1, Candidate_ID_X[i][k] is assigned as ID_X[i].<br>if f(b[i][1], . . . , b[i][n]) = 0, a random ID is assigned as ID_X[i]. |

Thus far, the overall flow of the common identifier generation method according to some embodiments of the present disclosure has been described with reference to FIGS. 3 through 7. As mentioned above, the containment operation is performed on the first record set and the identifier-assigned second record set, and the identifier for the first record set may be determined based on the output of the matching function for the results of the containment operation. In this case, a common identifier for the two record sets may be determined (or generated) more quickly (e.g., with lower complexity) than existing techniques. In other words, since the containment operation may be implemented with a complexity of O(N) (when the size of the larger of the two record sets is N), a common identifier may be generated more quickly and with fewer computational costs than existing techniques.

A common identifier generation method according to some embodiments of the present disclosure that considers cryptographic implementations will hereinafter be presented with reference to FIG. 8 and the subsequent drawings. For the sake of clarity, explanations of content that overlaps with the previous embodiments will be omitted.

FIG. 8 is a flowchart illustrating a common identifier generation method according to some embodiments of the present disclosure that considers cryptographic implementations.

Referring to FIG. 8, a CPSI protocol (or algorithm) and an oblivious shuffle (OS) protocol (algorithm) may be utilized to securely execute (or implement) the common identifier generation method of FIG. 3. Through these protocols, a common identifier for multiple record sets may be generated without leaking intermediate information or complete information to each party.

Specifically, in step S81, a matching function may be shared between the first and second parties. Step S81 corresponds to step S31 of FIG. 3 (for more details, refer to the description of step S31).

In step S82, the second party may assign an identifier to the second record set. Step S82 corresponds to step S32 of FIG. 3 (for more details, refer to the description of step S32).

Steps S83 through S86-2 may be understood as cryptographic implementations for securely executing step S33 of FIG. 3.

Specifically, in step S83, the first and second parties (i.e., the first and second devices 21 and 22) may perform a containment operation on the first and second record sets through the CPSI protocol. That is, the first and second parties may securely execute the containment operation for the first and second record sets by performing an operation (e.g., communications/interactions) based on the CPSI protocol.

In steps S84-1 and S84-2, as a result of the containment operation performed in step S83, the first and second parties may acquire secret shares. In other words, secret shares obtained by performing the containment operation based on the CPSI protocol may be distributed to the first and second parties. Since only the secret shares are distributed to the first and second parties without revealing complete information on the containment operation, it may be understood that the common identifier generation process is cryptographically secure.

For reference, the secret shares may refer to information that may recover containment information and the identifiers of the second record set (e.g., the identifier stored to be matched to each of the columns in the first record set). In other words, the containment information and the identifiers of the second record set may be secret information, and pieces of the secret information may be distributed to the first and second parties as the secret shares.

For a clearer understanding, the CPSI protocol-related steps of the common identifier generation method of FIG. 8, i.e., steps S83, S84-1, and S84-2, will hereinafter be described in further detail with reference to FIGS. 9 through 13.

Figure 10:
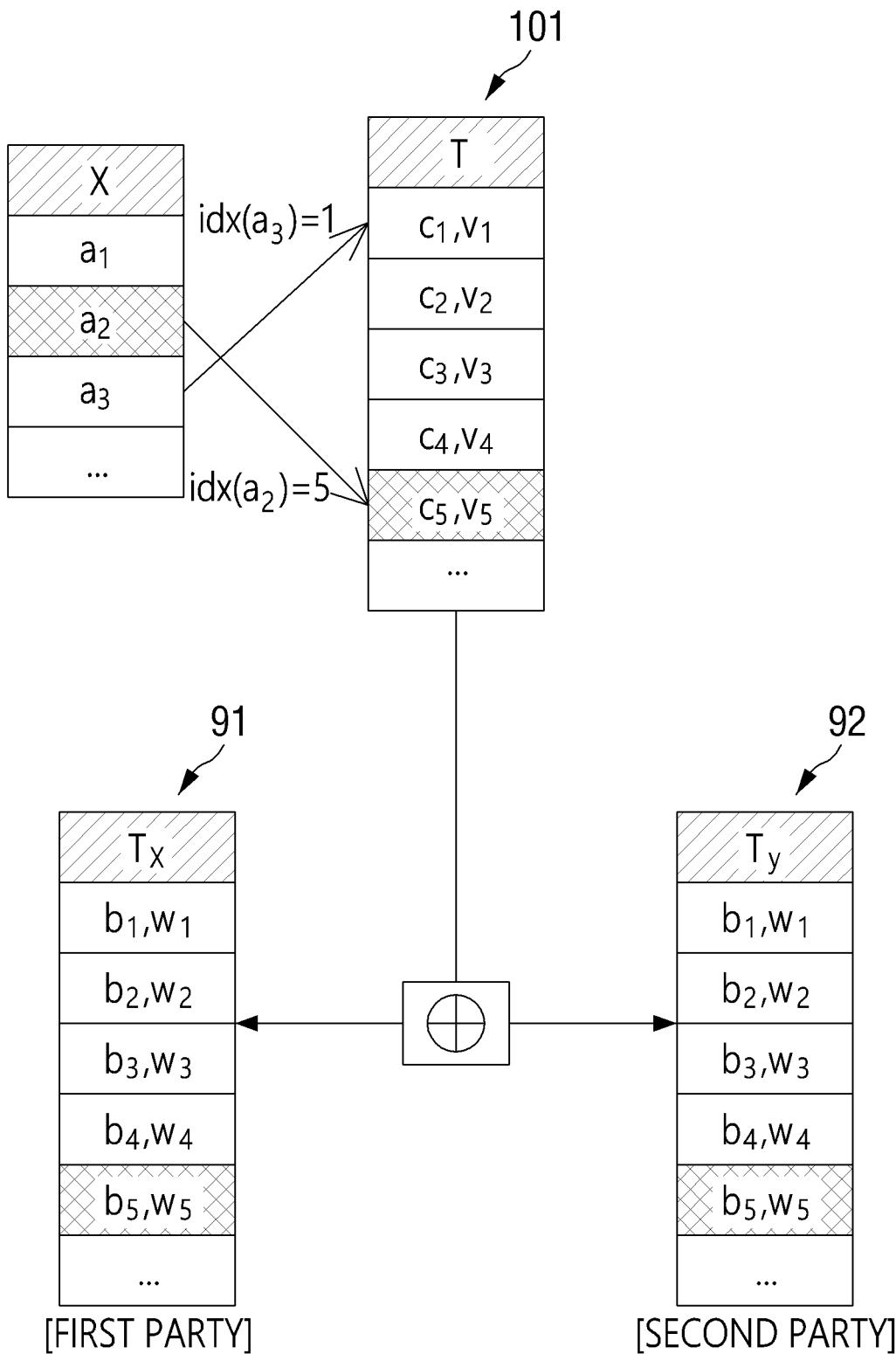

Referring to FIG. 10, the CPSI protocol is a protocol that may distribute only secret shares 91 and 92 to each of the first and second parties without revealing containment information (i.e., "c" vectors in secret information 101) and a value set V of an input set X. However, index function ("idx") information for the input set X (or index mapping information between the input set X and the secret share 91) may also be distributed to the first party. The containment operation is performed based on the CPSI protocol because secret information 101 with a different element order from the input set X may be generated (i.e., the element order of the secret information 101 may be dynamically determined during the CPSI protocol-based containment operation). All CPSI protocols providing the complexity of O(N) are known to have these characteristics, and an example of such CPSI protocols with the complexity of O(N) is, but not limited to, PSTY19. The details of the PSTY19 protocol may be found in the paper titled "Efficient Circuit-based PSI with Linear Communication."

For reference, referring to FIG. 10, the symbol "+" denotes an XOR (or addition) operation. In other words, the secret information 101 may be derived by performing an XOR operation on the secret shares 91 and 92. Additionally, the secret share 91 may consist of "b" vectors (or a "b" vector set) and "w" vectors (or a "w" vector set). The "b" vectors refer to secret share (or secret share pieces) related to containment information between the sets X and Y (refer to the "c" vectors in the secret information 101), and the "w" vectors refer to secret share (or secret share pieces) of the value set V (or "v" vectors in the secret information 101). The number of elements in each vectors (b and w vectors) is equal to the number of elements in the input set X.

Figure 11:
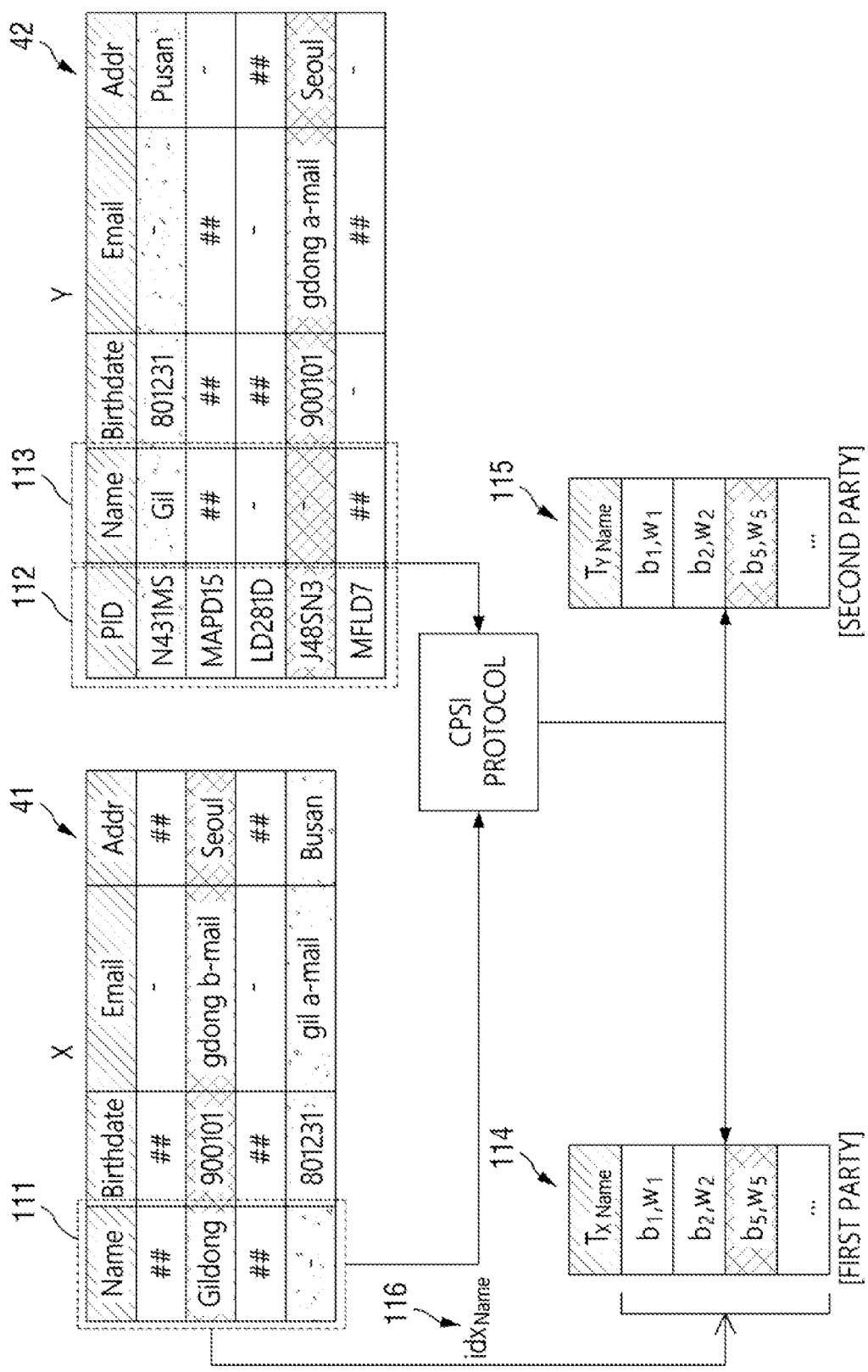
FIGS. 11 and 12 are schematic views illustrating how operations are performed based on the CPSI protocol according to some embodiments of the present disclosure.
Figure 12:
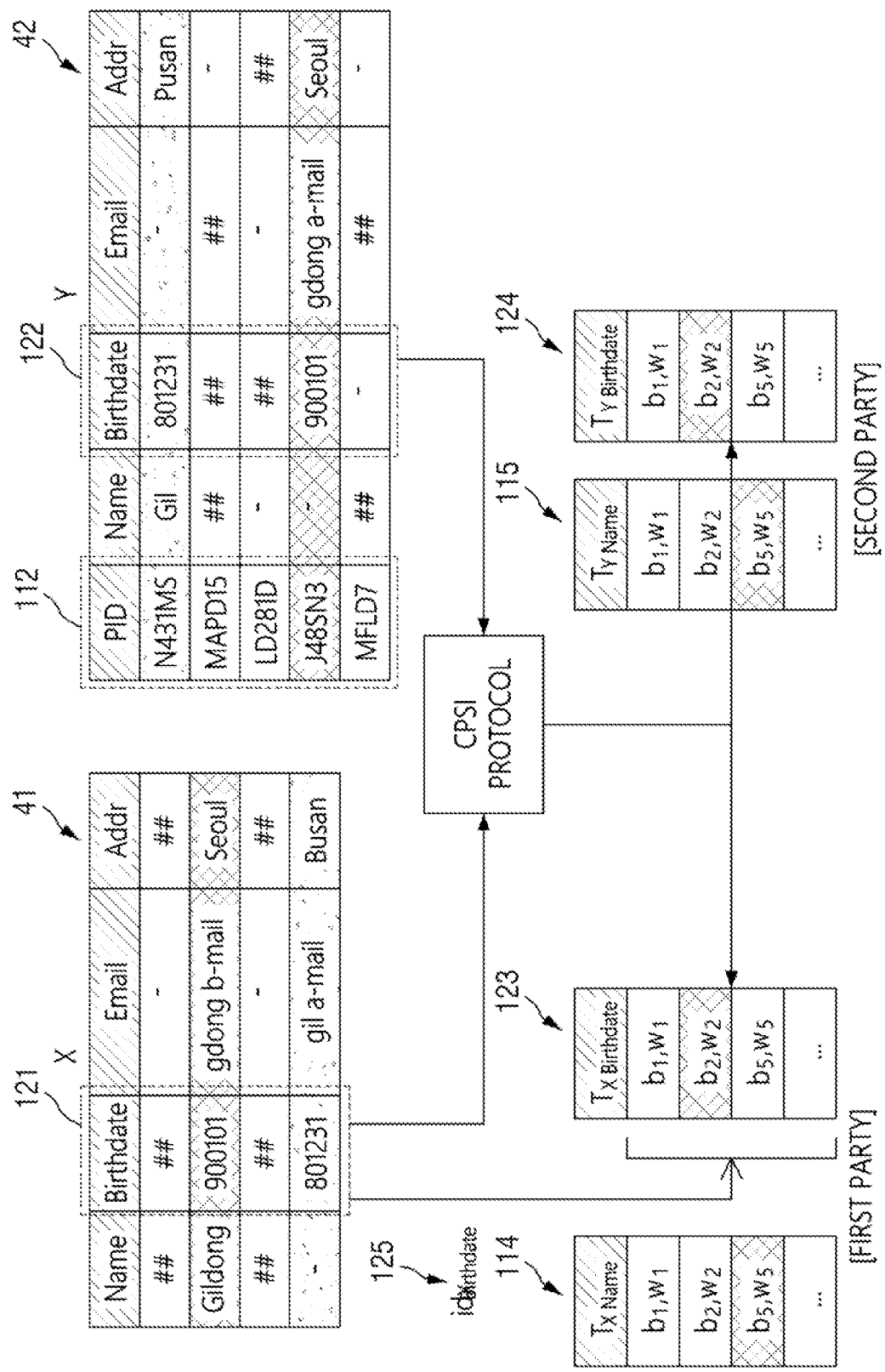
Figure 13:
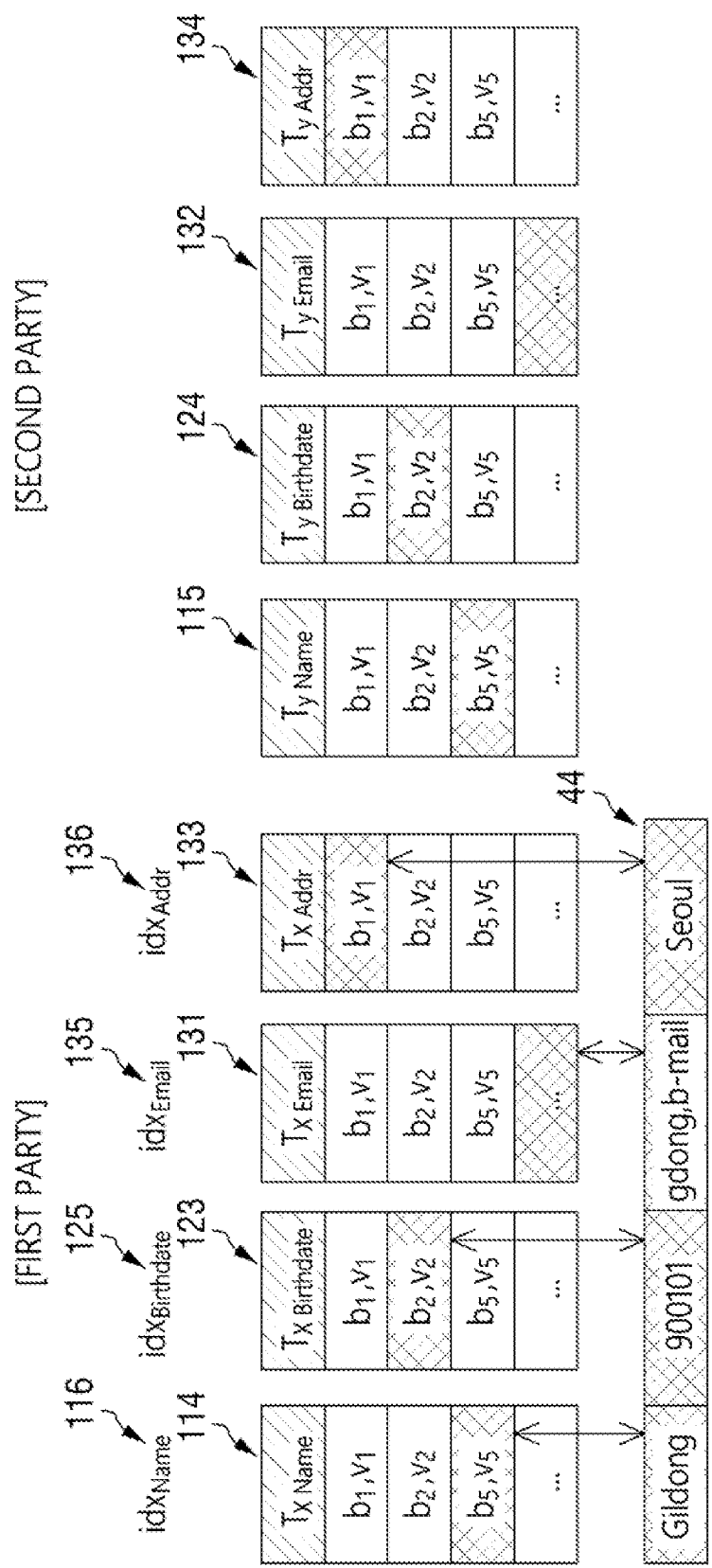
FIG. 13 is a schematic view illustrating the results of a containment operation performed based on the CPSI protocol according to some embodiments of the present disclosure.

FIGS. 11 through 13 illustrate how the first and second parties perform an operation based on the CPSI protocol. Specifically, FIGS. 11 through 13 assume that the CPSI protocol-based operation is performed on the first and second record sets 41 and 42 of FIG. 4.

Referring to FIG. 11, the first and second parties may perform a CPSI protocol-based containment operation in units of the columns in the first record set 41. For example, the first and second parties may perform the CPSI-based containment operation using data 111 from the first column (i.e., the "Name" column) in the first record set 41, "PID" column data 112 of the second record set 42, and data 113 from the column (i.e., the "Name" column) in the second record set 42 that corresponds to the first column in the first record set 41. As a result, secret shares 114 and 115 for the first column in the first record set 41 may be generated and distributed to each of the first and second parties. Specifically, the secret share 114 may be distributed to the first party, and the secret share 115 may be distributed to the second party. Here, an index function 116 ("$idx_{Name}$") or index mapping information for the first column in the first record set 41 may be further distributed to the first party.

The first and second parties may repeatedly perform the CPSI protocol-based operation on the other columns in the first record set 41. For example, referring to FIG. 12, the first and second parties may perform the CPSI-based containment operation using data 121 from the second column (i.e., the "Birthdate" column) in the first record set 41, the "PID" column data 112 of the second record set 42, and data 122 from the column (i.e., the "Birthdate" column) in the second record set 42 that corresponds to the second column in the first record set 41. As a result, secret shares 123 and 124 for the second column of the first record set 41 may be generated and distributed to each of the first and second parties. Here, an index function 125 ("$idxBirth_{date}$") or index mapping information for the second column in the first record set 41 may be further distributed to the first party.

FIG. 13 depicts the results of a CPSI protocol-based operation performed for all the columns in the first record set 41. Referring to FIG. 13, the results of the CPSI protocol-based operation may include secret shares 114 and 115, 123 and 124, 131 and 132, and 133 and 134 for column-wise containment information and index functions 116, 125, 135, and 136. FIG. 13 assumes that, for example, the secret shares 114, 123, 131, and 133, have different element orders from one another (refer to the second record 44 of the first record set 41 and its corresponding element positions).

Referring back to FIG. 8, in step S85, the first and second parties may perform a rearrangement operation to align the element orders of the acquired secret shares through an OS protocol. In other words, the first party may rearrange the acquired secret shares by performing an operation (e.g., communications/interactions) with the second party based on the OS protocol. This OS protocol-based operation may be performed using a permutation function provided by the first party and secret shares provided by the second party, and this will be described later in further detail.

For reference, the rearrangement operation is performed because secret shares generated through the CPSI protocol may have different element orders, and the OS protocol is used to perform the rearrangement operation to ensure a cryptographically secure execution of the rearrangement operation (e.g., without exposure of intermediate information).

An example of the OS protocol may be CGP20, but the present disclosure is not limited thereto. The details of CGP20 may be found in the paper entitled "Secret-Shared Shuffle."

In steps S86-1 and S86-2, as a result of the OS protocol-based operation performed in S85, the first and second parties may acquire the rearranged secret shares.

For a better understanding, the OS protocol-related steps, i.e., steps S85, S86-1, and S86-2), will hereinafter be described in further detail with reference to FIGS. 14 through 18.

Figure 14:
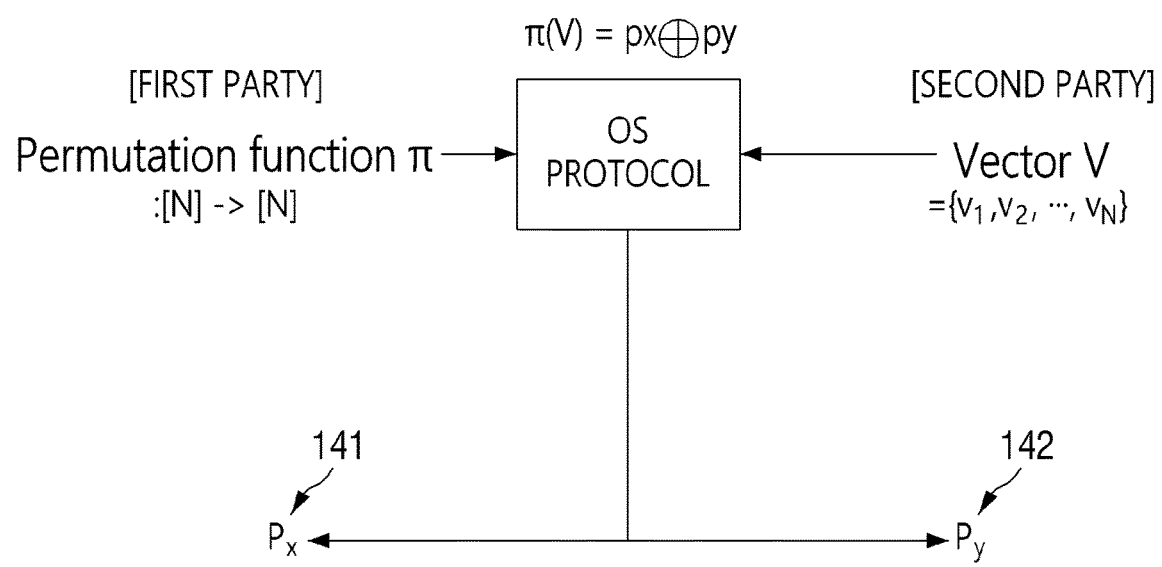
FIG. 14 is a schematic view illustrating an oblivious shuffle (OS) protocol that may be referenced in some embodiments of the present disclosure.

First, a brief explanation of the OS protocol will be presented with reference to FIG. 14.

Referring to FIG. 14, the OS protocol is a protocol that generates a rearranged vector $\pi(V)$ by applying a permutation function $\pi$ input from the first party to a vector V input from the second party, and distributes resulting secret shares 141 and 142 to each of the first and second parties. Therefore, the OS protocol may be used to rearrange the element order of the vector V held by the second party without revealing the order information of the vector (or set) held by the first party.

The permutation function provided by the first party refers to a function that changes the arrangement (i.e., element order) of a vector (or set). Similarly to what has been described above with regard to the CPSI protocol, the secret share 141 ("px") may be distributed to the first party, and the secret share 142 ("py") may be distributed to the second party. Then, by performing an XOR operation on the secret shares 141 and 142, the rearranged vector (x (V)) may be derived.

FIGS. 15 through 18 illustrate how the first and second parties perform a rearrangement operation based on the OS protocol. FIGS. 15 through 18 assume that the OS protocol is performed using, for example, the secret share 124 and the index function 125 of FIG. 13. FIGS. 15 through 18 assume that the element order of, for example, the secret share 123, is rearranged based on the secret share 114 for the first column (i.e., the "Name" column) in the first record set 41, but the present disclosure is not limited thereto. Alternatively, the rearrangement of the element order of the secret share 123 may be performed based on the element order of other secret shares (or the record order in the first record set 41).

Figure 15:
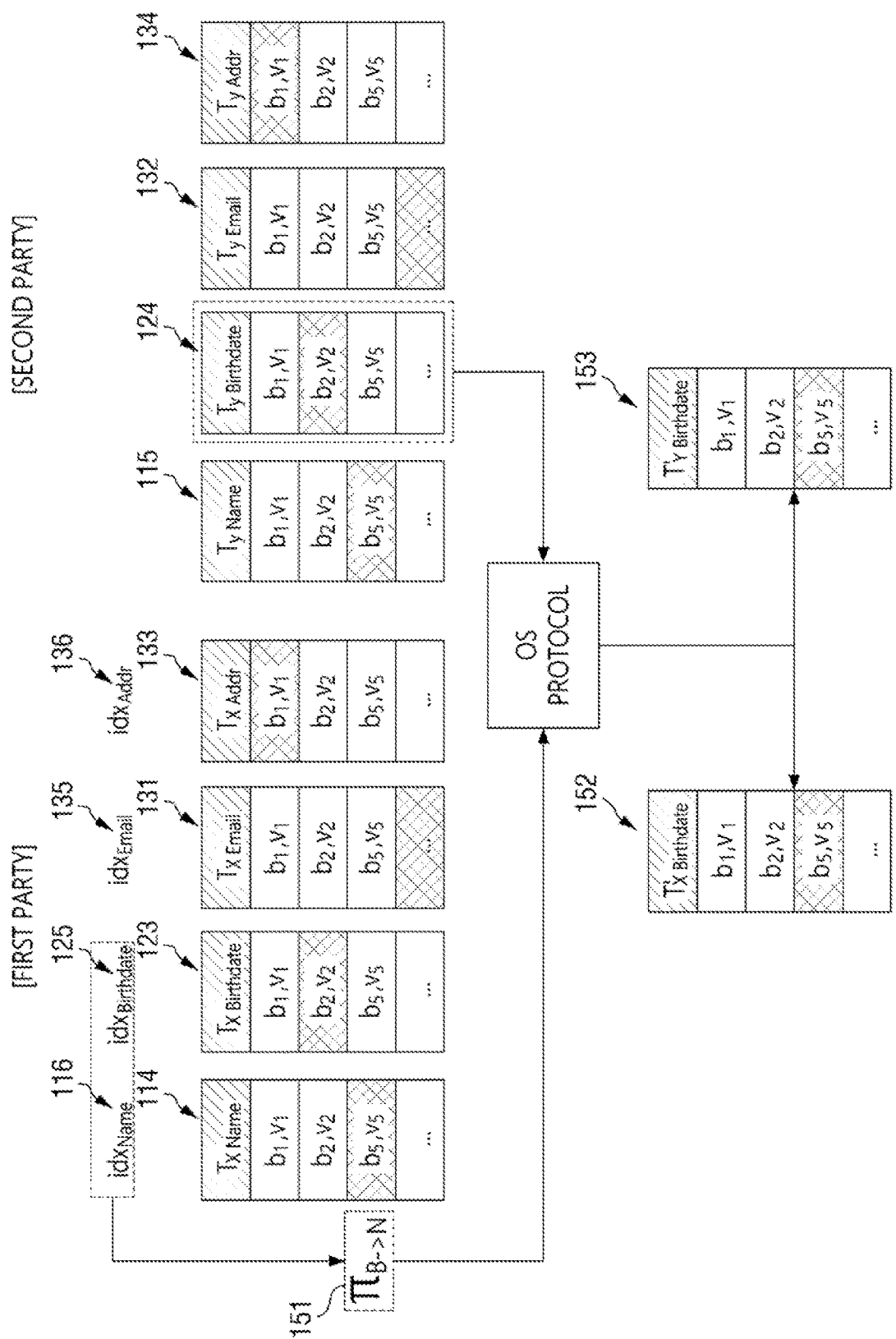
FIGS. 15 through 17 are schematic views illustrating how a rearrangement operation is performed based on the OS protocol according to some embodiments of the present disclosure.

Referring to FIG. 15, the first and second parties may perform an operation according to the OS protocol using a permutation function 151 ("$\pi_{B \to N}$") and the secret share 124. When rearranging the secret share 123 for the second column (i.e., the "Birthdate" column) to be aligned with the secret share 114 for the first column (i.e., the "Name" column), the permutation function 151 is defined based on the index function 125 ("$\mathrm{idx}_{Birthdate}$") for the second column and the index function 116 ("$\mathrm{idx}_{Name}$") for the first column, and the secret share 124 provided by the second party correspond to the secret share for the column in the second record set 42 that corresponds to the second column in the first record set 41. In other words, the permutation function 151 is defined based on the index function 125, which is the index function for a rearrangement target column (or a rearrangement target secret share), and the index function 116, which is the index function for a rearrangement reference column (or a rearrangement reference secret share), and the secret share 124 provided by the second party corresponds to the secret share for the column in the second record set 42 that corresponds to the rearrangement target column in the first record set 41.

As a result of the rearrangement operation performed based on the OS protocol, new secret shares 152 and 153 are generated. The secret share 152 may be distributed to the first party, and the secret share 153 may be distributed to the second party. Here, secret information regarding the secret shares 152 and 153 may be rearrangement results for the secret share 124 for the second column in the second record set 42 (e.g., a rearrangement result for the secret share 124 may be derived by performing an XOR operation on the secret shares 152 and 153).

For reference, each rearranged secret share is marked with a single apostrophe (') in FIG. 15 and the subsequent drawings.

Figure 16:
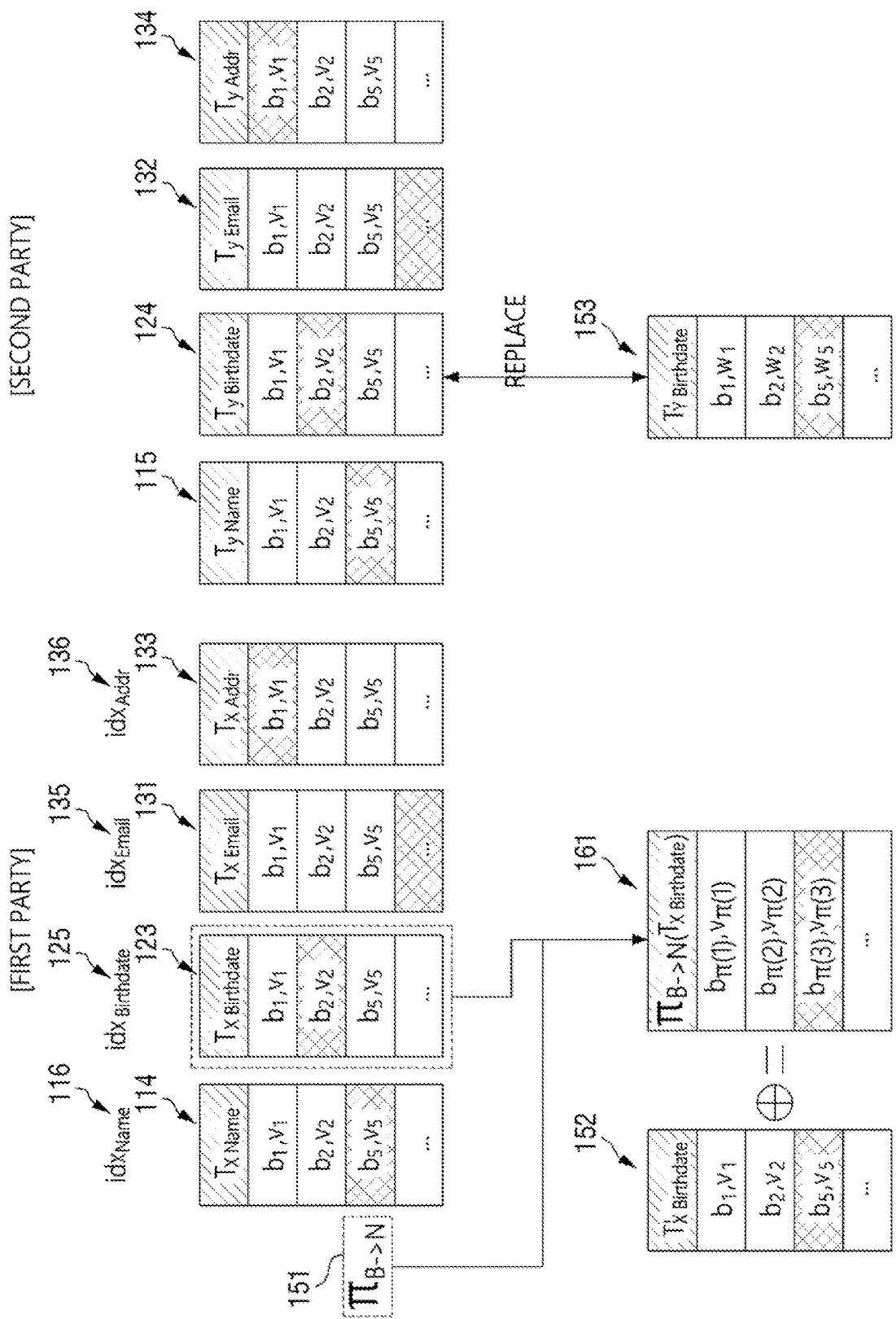

Thereafter, referring to FIG. 16, the second party may replace the secret share 124 for the second column in the second record set 42 that corresponds to the second column in the first record set 41 with the secret share 153, which is the rearranged secret share obtained through the OS protocol. This is feasible because the element order of the secret share 153 is identical to that of the secret share 114 for the first column in the first record set 41.

Also, as the second party's secret share is replaced, the first party may also replace the existing secret share 123 with the rearranged secret share 152. The first party may additionally perform an update operation on the rearranged secret share 152. The replacement operation may be performed after the update operation. In other words, the first party may update the secret share 152 to correspond to the second party's secret share 153 (e.g., to derive secret information through an XOR operation). Specifically, the first party may rearrange the secret share 123 for the second column (e.g., the "Birthdate" column) using the permutation function 151 and may then reflect the result of the rearrangement, i.e., a secret share 161 ("$\pi_{B \to N}(T_{X\,Birth})$"), in the secret share 152. For example, the first party may reflect the secret share 161, which is a rearranged secret share, through an XOR (or addition) operation. As a result, the first party's secret share 152 may be updated to correspond to the second party's secret share 153, as indicated by "181" of FIG. 18.

Figure 17:
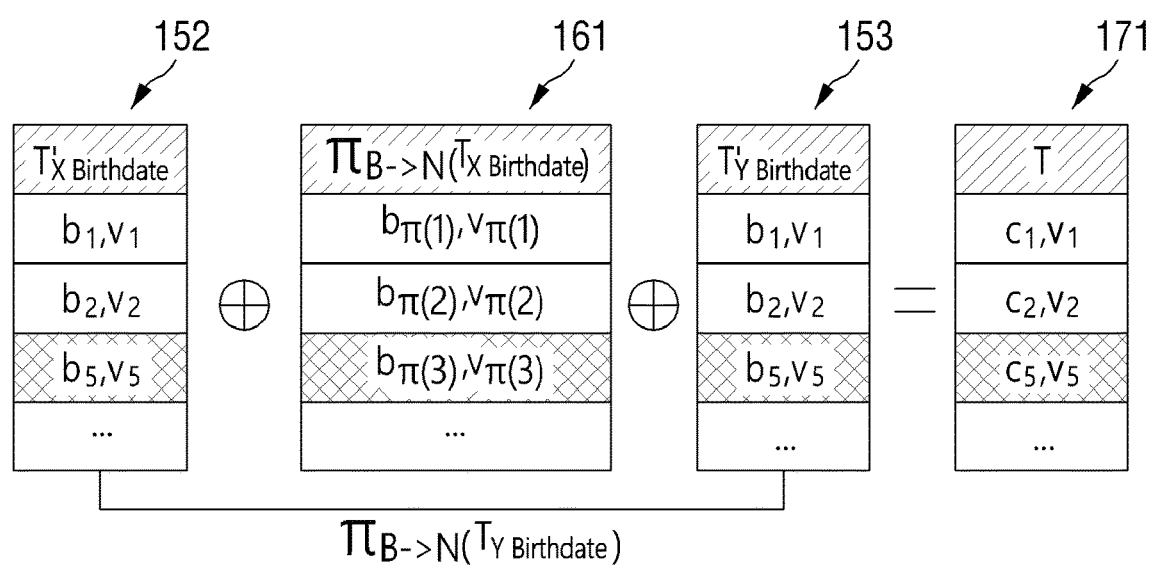

FIG. 17 is a schematic view illustrating the update operation.

Referring to FIG. 17, secret information 171 (i.e., containment information and the identifiers of the second record set 42) may be derived by performing an XOR operation on the secret shares 152 and 153, which are acquired through the OS protocol, and the first party's rearranged secret share 161. This is because by performing an XOR operation on the secret shares 152 and 153, the second party's rearranged secret share ("$\pi_{B \to N}(T_{Y\ Birth})$") corresponding to the first party's rearranged secret share 161 is derived. Therefore, it may be understood that a secret share 181 of FIG. 18 that corresponds to the second party's rearranged secret share, i.e., the secret share 153, may be generated by reflecting the first party's rearranged secret share, i.e., the secret share 161, in the secret share 152.

The first and second parties may also perform the rearrangement operation on other secret shares for other columns (e.g., the secret shares 131 and 132) through the OS protocol. FIG. 18 shows the outcomes of the rearrangement operation performed on all the columns in the first record set 41, i.e., the secret shares 114 and 115, 181 and 153, 182 and 183, 184 and 185.

Referring to FIG. 18, it is confirmed that the secret shares 181, 182, and 184 for columns other than the first column of the first party have been updated to be aligned with the second party's secret shares 153, 183, and 185, respectively.

For reference, each updated secret share (e.g., the secret share 181) is marked with two apostrophe (") in FIG. 18.

Referring back to FIG. 8, in step S86, the first and second parties may compute the output values of the matching function through a multi-party computation protocol. Specifically, the first and second parties may compute the output values of the matching function and the identifiers of the second record set for the corresponding records in the first record set by performing an operation based on their sets of secret shares (i.e., the first party's multiple secret shares and the second party's multiple secret shares) according to the multi-party computation protocol.

Figure 19:
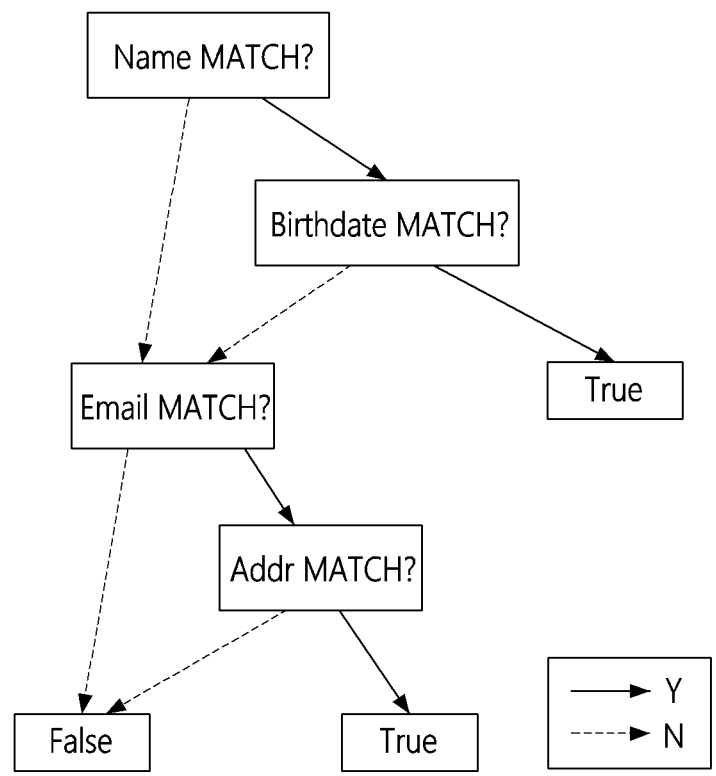
FIG. 19 is a schematic view illustrating a binary decision diagram (BDD) for a matching function that may be referenced in some embodiments of the present disclosure.

Specifically, a Boolean operator-based matching function may be represented as a binary decision diagram (BDD), and with the multi-party computation protocol, the first and second parties may perform an operation according to the BDD while holding their secret shares. For example, FIG. 19 illustrates a BDD for the matching function indicated by Equation (1) above, and the first and second parties may compute the output values of the matching function through a 2-party computation protocol such as Yao's garbled circuit or Goldreich-Micali-Wigderson (GMW) protocol (e.g., by performing an operation in units of rows (or records) of each secret share). Additionally, the first party may also obtain the identifiers of the second record set (i.e., the identifiers that have been stored to be matched to the columns in the first record set 41) using the aforementioned computation protocol. This is considered obvious to those skilled in the art to which the present disclosure pertains, and further explanation is therefore omitted.

As a result, by using the multi-party computation protocol, the first party may obtain the output values of the matching function and the identifiers of the second record set for the corresponding records in the first record set.

In step S88, the first party may determine the identifiers of the first record set based on the output values of the matching function. Step S88 corresponds to step S34 of FIG. 3 (for more details, refer to the description of step S34).

So far, cryptographic implementations for the common identifier generation method according to some embodiments of the present disclosure have been explained with reference to FIGS. 8 through 19. According to the foregoing, the first and second parties may perform a containment operation on the first and second record sets based on the CPSI and OS protocols. In this case, cryptographic security is ensured for the generation of a common identifier because only secret shares are distributed to each of the first and second parties without leaking intermediate or complete information. Moreover, the common identifier may be securely created and assigned without the aid of a trusted institution.

An example computing device 200 that may implement each of the first and second devices 21 and 22, which may also be referred to as common identifier generation devices, will hereinafter be described.

FIG. 20 is a hardware configuration view illustrating a computing device 200.

Referring to FIG. 20, the computing device 200 may include at least one processor 201, a bus 203, a communication interface 204, and a memory 202, which loads at least one computer program 206 executed by the processor 201, and a storage 205, which stores the computer program 206. FIG. 20 only illustrates components relevant to the embodiments of the present disclosure, and it is obvious that the computing device 200 may further include other general components other than those illustrated in FIG. 20. In other words, the computing device 200 may be configured to include various components other than those illustrated in FIG. 20 or may be configured without some of the components illustrated in FIG. 20. The components of the computing device 200 will hereinafter be described.

The processor 201 may control the overall operations of the components of the computing device 200. The processor 201 may be configured to include at least one of a central processing unit (CPU), a micro-processor unit (MPU), a micro controller unit (MCU), a graphic processing unit (GPU), and any other known form of processor in the field to which the present disclosure pertains. The processor 201 may perform computations for at least one application or program for executing operations/methods according to some embodiments of the present disclosure. The computing device 200 may be equipped with one or more processors.

The memory 202 may store various data, commands, and/or information. The memory 202 may load the computer program 206 from the storage 205 to execute the operations/methods according to some embodiments of the present disclosure. The memory 202 may be implemented as a volatile memory such as a random-access memory (RAM), but the present disclosure is not limited thereto.

The bus 203 may provide communication functionality among the components of the computing device 200. The bus 203 may be implemented in various forms, including an address bus, a data bus, and a control bus.

The communication interface 204 may support both wired and wireless Internet communication for the computing device 200. Additionally, the communication interface 204 may also support various other communication methods. For this purpose, the communication interface 204 may be configured to include a communication module that is well known in the field to which the present disclosure pertains.

The storage 205 may temporarily store at least one computer program 206. The storage 205 may be configured to include a non-volatile memory (such as a read-only memory (ROM), an erasable programmable ROM (EPROM), an electrically erasable programmable ROM (EEPROM), or a flash memory), a hard disk, a removable disk, or any other well-known computer-readable medium in the field to which the present disclosure.

The computer program 206 may include one or more instructions that, upon being loaded into the memory 202, allow the processor 201 to perform the operations/methods according to some embodiments of the present disclosure. In other words, by executing the loaded instructions, the processor 201 may perform the operations/methods according to some embodiments of the present disclosure.

For example, the computer program 206 may include instructions to perform the operations of: acquiring a matching function, which is used for record matching between the first and second record sets; performing a containment operation on the second record set and column values of each of records in the first record set; and determining identifiers for at least some of the records in the first record set based on the identifiers of the second record set and output values of the matching function for results of the containment operation. In this example, the first device 21 may be implemented by the computing device 200.

In another example, the computer program 206 may include instructions to perform the operations of: acquiring a matching function, which is used for record matching between the first and second record sets; assigning identifiers to the identifier column of the second record set; and performing a containment operation on the second record set and column values of each of records in the first record set. In this example, the second device 22 may be implemented by the computing device 200.

In yet another example, the computer program 206 may include instructions to perform at least some of the steps/operations described above with reference to FIGS. 2 through 19. In this example, the first device 21 and/or the second device 22 may be implemented by the computing device 200.

In some embodiments, the computing device 200 may refer to a virtual machine implemented based on cloud technology. For example, the computing device 200 may be a virtual machine operating on one or more physical servers within a server farm. In this example, at least some of the components of the computing device 200, i.e., the processor 201, the memory 202, and the storage 205, may be implemented as virtual hardware, and the communication interface 204 may be implemented as a virtual networking element such as a virtual switch.

An example computing device 200 that may implement each of the first and second devices 21 and 22 has been described so far with reference to FIG. 20.

Various embodiments of the present disclosure and their effects have been described with reference to FIGS. 1 through 20.

According to some embodiments of the present disclosure, a containment operation is performed on the first party's record set (or the first record set) and the second party's record set (or the second record set) with identifiers assigned, and identifiers for the first record set may be determined based on the output values of the matching function for the results of the containment operation. For example, if the output value of the matching function for a first record in the first record set indicates that there exists a matching second record for the first record in the second record set, the identifier of the second record may be determined as the identifier for the first record (i.e., the same identifier is assigned to both the first and second records). In this case, a common identifier for both the first and second records may be determined (or generated) more quickly (e.g., with lower complexity) compared to existing techniques. Specifically, the containment operation may be implemented with a complexity of O(N) (when the size of the larger of the first and second record sets is "N"), allowing for a common identifier to be generated more quickly and at lower computational cost compared to existing techniques.

Additionally, the first and second parties may perform the containment operation on the first and second record sets based on the CPSI and OS protocols. In this case, since only secret shares are distributed to each of the first and second parties without leaking intermediate or complete information, cryptographic security for a common identifier generation process may be ensured. Furthermore, a common identifier may be securely generated and assigned even without the aid of a trusted third party.

However, the technical concepts of the present disclosure are not limited to the effects set forth herein, and other effects not explicitly mentioned may be readily understood by those skilled in the art to which the present disclosure, from the provided description below.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method for generating a common identifier performed by a computing device of a first party, the method comprising:
    acquiring a matching function, which is used for record matching between a first record set and a second record set, the first record set and the second record set being a record set of the first party and a record set of a second party, respectively, and the second record set having an identifier column with identifiers assigned;
    performing a containment operation on each record in the second record set and each of a plurality of columns of each record in the first record set; and
    determining an identifier for at least some of records in the first record set based on the identifiers of the second record set and an output value of the matching function for a result of the containment operation.

2. The method of claim 1, wherein the matching function is defined based on Boolean operator.

3. The method of claim 1, wherein the performing the containment operation comprises:
when a particular column value of a first record in the first record set is contained in a second record in the second record set, storing an identifier of the second record in the result of the containment operation.

4. The method of claim 1, wherein the determining the identifier comprises:
when as a result of applying a containment operation result for a first record in the first record set to the matching function, a value indicating that the second record set contains a second record that matches the first record is output, determining an identifier of the second record as an identifier of the first record.

5. The method of claim 1,
wherein the determining the identifier comprises:
when as a result of applying a containment operation result for a first record in the first record set to the matching function, a value indicating that the second record set does not contain a second record that matches the first record is output, determining an identifier of the first record randomly.

6. The method of claim 1,
wherein the performing the containment operation comprises:
performing a first operation with the second party based on a circuit-based private set intersection (CPSI) protocol using data from a first column of the first record set, data from a second column of the second record set, and data from the identifier column of the second record set, the second column being a column that corresponds to the first column; and
acquiring a first secret share for the first column as a result of the first operation, the result of the first operation including the first secret share and a second secret share,
wherein the second secret share is distributed to the second party, and
the first secret share and the second secret share are secret shares regarding containment information of the first column and the data from the identifier column of the second record set.

7. The method of claim 6, wherein the performing the containment operation further comprises:
acquiring a third secret share for a third column of the first record set by performing a second operation with the second party based on the CPSI protocol using data from the third column of the first record set, data from a fourth column of the second record set, and data from the identifier column of the second record set, the fourth column being a column that corresponds to the third column, a result of the second operation including the third secret share and a fourth secret share, the fourth secret share being distributed to the second party, and the first secret share having a different element order from the third secret share and the fourth secret share; and
performing a third operation based on an oblivious shuffle (OS) protocol with the second party based on the fourth secret share and a permutation function for rearranging an element order of the third secret share to be aligned with the first secret share.

8. The method of claim 7,
wherein the performing the containment operation further comprises:

acquiring a fifth secret share as a result of the third operation, the result of the third operation including the fifth secret share and a sixth secret share and the sixth secret share being distributed to the second party;
rearranging the element order of the third secret share using the permutation function;
updating the fifth secret share by reflecting the rearranged third secret share in the fifth secret share; and
replacing the third secret share with the updated fifth secret share,
wherein the fourth secret share held by the second party is replaced with the sixth secret share.

9. The method of claim 6,
wherein a first plurality of secret shares including the first secret share are acquired as the result of the first operation,
a second plurality of secret shares including the second secret share are distributed to the second party, and
wherein the determining the identifier comprises:
acquiring an output value of the matching function for a particular record in the first record set by performing an operation with the second party based on a multi-party computation protocol using the first plurality of secret shares and the second plurality of secret shares; and
determining an identifier of the particular record based on the acquired output value.

10. A method for generating a common identifier performed by a computing device of a second party, the method comprising:
acquiring a matching function, which is used for record matching between a first record set and a second record set, the first record set and the second record set being a record set of a first party and a record set of the second party, respectively;
assigning identifiers to an identifier column of the second record set; and
performing a containment operation on each record in the second record set and each of a plurality of columns of each record in in the first record set,
wherein an identifier for at least some of records in the first record set is determined based on the identifiers of the second record set and an output value of the matching function for a result of the containment operation.

11. The method of claim 10, wherein the identifiers assigned to the identifier column are determined randomly.

12. The method of claim 10,
wherein the performing the containment operation comprises:
performing a first operation with the first party based on a circuit-based private set intersection (CPSI) protocol using data from a first column of the first record set, data from a second column of the second record set, and data from the identifier column of the second record set, the second column being a column that corresponds to the first column; and
acquiring a second secret share as a result of the first operation, the result of the first operation including a first secret share and the second secret share,
wherein the first secret share is distributed to the first party, and
the first secret share and the second secret share are secret shares regarding containment information of the first column and the data from the identifier column.

13. The method of claim 12,
wherein the performing the containment operation further comprises:

performing a second operation with the first party based on the CPSI protocol using data from a third column of the first record set, data from a fourth column of the second record set, and data from the identifier column of the second record set, the fourth column being a column of that corresponds to the third column;

acquiring a fourth secret share as a result of the second operation, the result of the second operation including a third secret share and the fourth secret share, the third secret share being distributed to the first party, and the second secret share having a different element order from the third and fourth secret shares; and performing a third operation based on an oblivious shuffle (OS) protocol with the first party based on the fourth secret share and a permutation function for rearranging an element order of the third secret share to be aligned with the first secret share.

14. The method of claim 13, wherein the performing the containment operation further comprises:

acquiring a sixth secret share as a result of the third operation, the result of the third operation including a fifth secret share and the sixth secret share and the fifth secret share being distributed to the first party; and replacing the fourth secret share with the sixth secret share.

15. An apparatus for generating a common identifier comprising:

at least one processor;

a communication interface configured to communicate with a second party; and a memory configured to store a computer program to be executed by the at least one processor, wherein the computer program comprises instructions for:

acquiring a matching function, which is used for record matching between a first record set and a second record set, the first record set and the second record set being a record set of the first party and a record set of a second party, respectively, and the second record set having an identifier column with identifiers assigned;

performing a containment operation on each record in the second record set and each of a plurality of columns of each record in the first record set; and determining an identifier for at least some of records in the first record set based on the identifiers of the second record set and an output value of the matching function for a result of the containment operation.

16. An apparatus for generating a common identifier comprising:

at least one processor;

a communication interface configured to communicate with a first party; and a memory configured to store a computer program to be executed by the at least one processor, wherein the computer program comprises instructions:

acquiring a matching function, which is used for record matching between a first record set and a second record set, the first record set and the second record set being a record set of a first party and a record set of the second party, respectively;

assigning identifiers to an identifier column of the second record set; and performing a containment operation on each record in the second record set and each of a plurality of columns of each record in the first record set, and wherein an identifier for at least some of records in the first record set is determined based on the identifiers of the second record set and an output value of the matching function for a result of the containment operation.

\* \* \* \* \*